Patented Sept. 6, 1949

2,481,354

UNITED STATES PATENT OFFICE 2,481,354

BIAS INDICATOR

Reginald G. Schuler, Crystal Lake, Ill., assignor to Teletype Corporation, Chicago, Ill., a corporation of Delaware Application March 11, 1948, Serial No. 14,300

1 Claim. (Cl. 315—24)

This invention relates to telegraph testing systems, and more particularly to telegraph testing apparatus employing a cathode-ray tube to indicate the amount of bias or distortion present in the transmission of telegraph signals.

It is an object of the invention to provide a telegraph system using the five-unit telegraph permutation code signal combination with a cathode ray bias indicator to indicate the bias or distortion present in the transmission of signal impulse changes from marking to spacing, and, vice versa.

Another object of the invention is to provide a telegraph testing apparatus employing a simplified circuit to give an accurate indication of any distortion of signal impulses.

These and other objects of the invention are accomplished by providing a cathode ray bias indicator with a cathode ray tube having a screen upon which the changes or transitions between impulses of different nature appear as luminous spots. An electron beam sweeps across the screen in a spiral manner, making one convolution for each impulse of the code combination. If there is no distortion of signal impulses, the luminous spots appear in a single radial line. Any distortion present is evidenced by deviation of the spots from said radial line, which distortion deviation is read on a scale placed upon the tube face.

These and other features of the invention will more fully appear from the following detailed description taken in connection with the accompanying drawing, in which:

Fig. 1 is a circuit diagram of the cathode ray bias indicator;

Fig. 2 is a graphical representation of marking-spacing impulses in a start-stop permutation code signal combination; and Fig. 3 is a diagrammatic view showing the path of impingement of the electron beam upon the screen of the cathode ray tube obtained with the apparatus of Fig. 1.

Referring now to Fig. 1 wherein the circuit of the testing apparatus is shown, the reference numeral 11 designates that part of the detecting circuit through which the signals are received. Connected to the circuit 11 by conductors 12 and 13 are two primary coils 14 and 15 of iron core transformers 16 and 17, respectively. The signals introduced from input circuit 11 into coils 14 and 15 are induced into the secondary coils 18 and 19, which are connected to an electrical source of power 20 through adjustable resistances 21 and 22, respectively. The current from the secondary coil 18 supplies potential to a grid 23 in a gas tube oscillator 24 which controls the electron emission from a cathode 25 in the tube 24; the cathode 25 being directly heated by current from an electrical source 20 through an adjustable resistance 26.

The other secondary coil 19 transmits signal current to a grid 27 in a triode 28 through a circuit comprising a fixed resistor 29 in parallel with the coil 19 and a condenser 30 which is in series with the resistor 29. The triode 28 has a cathode 31 which is energized from the electrical source 20 by means of an adjustable resistance 32, the emission of electrons from the cathode 31 being controlled by the grid 27. The operation of the tube 28 is influenced by the transitions in line current which occur when there is a change from a marking signal to a spacing signal and vice versa and this results in a short positive impulse being applied to a plate 33 of the tube 28.

Referring back to the gas tube 24, upon initiation of a series of code combination of impulses into the input circuit 11, the grid 23 is energized to control the passage of current from the cathode 25 to a plate 34 of tube 24 which plate receives a potential from the electrical source 20 through an adjustable resistance 35 and a resistance 36 which is in series with the plate 34. The cathode plate circuit of the gas tube 24 includes a condenser 37 which is connected in parallel with the cathode 25 and the plate 34. The inclusion of the condenser 37 serves to vary the current flow in the tube 24 so that the resultant output from plate 34 is in the form of a saw tooth wave.

The output of the oscillator tube 24 is impressed upon a grid 38 of an oscillator converter tube 39; the plate 34 of tube 24 being connected to the grid through the adjustable resistor 36 and a conductor 40. The converter tube 39 has a grid 41 which is supplied with oscillating current from an oscillator coil 42 which is energized from the electrical source 20 through an adjustable resistance 43. A tuning condenser 44 is connected in parallel with the oscillator coil 42 which has a tap 45 taken off its midpoint to the cathode 46 of the tube 39. The current flow through the tube 39 from the cathode 46 to a plate 47 is controlled by the grid 41 which results in an audio-frequency wave and this in turn is modulated by a saw tooth bias from the grid 38, the resultant current issuing forth from the oscillator converter tube 39 as an audio frequency wave modulated by a saw tooth bias.

A transformer 48 has its primary coil 49 connected to the plate 47 of the oscillator converter

UNITED STATES PATENT OFFICE 2,481,372

RUST PROTECTIVE LUBRICANTS

George Hugo von Fuchs, Wood River, and Gerhard P. Pilz, Alton, Ill., assignors to Shell Development Company, San Francisco, Calif., a corporation of Delaware No Drawing. Application September 27, 1946, Serial No. 699,644

7 Claims. (Cl. 252—48.6)

The present invention relates to compositions having anti-corrosive, and especially rust-protective properties. More particularly, it deals with compositions comprising certain esters of polybasic organic acids containing a minor amount of organic acid-acting materials which are highly effective corrosion inhibitors when used in combination with such esters.

Metallic surfaces, particularly those containing iron, require protection against corrosion in the presence of water. To illustrate: Moisture readily attacks finished or semi-finished metal objects unless the metal surface is covered during storage or shipment by a protective coating such as a slushing oil; water in engine lubricants often corrodes closely fitted engine parts such as found in Diesel engines; water in turbines corrodes turbine lubricant circulatory systems, particularly the governor mechanisms of steam turbines.

Corrosion not only has a deleterious effect upon the metal surfaces, but also frequently forms finely divided metal oxides which may act as oxidation catalysts, increasing the rate of deterioration of various organic compounds with which they come in contact, or may enter between moving parts of machinery where they act as abrasives.

It is an object of this invention to provide effective corrosion-protective compositions of wide applicability. Another object of this invention is to produce lubricant oils and greases having improved corrosion-protective properties. A specific purpose of this invention is to produce rust-protective compositions comprising as the major lubricating base, esters of poly-basic organic acids as more particularly defined hereinafter.

The corrosion and rust problems involved when using compositions comprising these esters differ considerably from those which must be met when mineral oil lubricants are employed. In the latter case, the mineral oils, being substantially completely immiscible with water, have no tendency to absorb moisture from the surrounding atmosphere. The esters on the other hand, absorb moisture to an appreciable extent, thus promoting intimate contact between the latter and the metal being lubricated by them. Corrosion is thus promoted by the ordinary use of esters as lubricants, rather than discouraged, as in the case of mineral oils.

Moreover, the class of esters described herein, being of relatively high molecular weight, inherently act as protective colloids, and thereby mask the action of most of the ordinary rust inhibitors useful in mineral oil compositions. Consequently, while amounts of 0.001% to 0.1% of an inhibitor may provide excellent rust prevention in a mineral oil base composition, like compositions based upon the subject esters are unsatisfactory from the stand-point of rusting and corrosion.

Up to the present time, while certain esters of polybasic-organic acids have found use as lubricants, no suitable means has been found for making such substances rust-resistant, this in spite of the extensive disclosure and knowledge of various rust inhibitors for mineral oil lubricants.

Now, in accordance with this invention, it has been found that lubricating compositions comprising predominantly esters of polybasic organic acids having the general formula

wherein $n$ is an integer, $R_1$, $R_2$ and $R_3$ are organic radicals (especially hydrocarbon radicals) having more than two carbon atoms, and $R_4$ and $R_5$ are substituents such as hydrogens or organic radicals (especially hydrocarbon radicals), may be made substantially rust-protective by the inclusion or incorporation of a minor amount of an organic acid acting material capable of forming water-insoluble metallic soaps. Preferably, the acid is insoluble in water.

Further, in accordance with this invention, it has been found that the action of such acidic materials as rust inhibitors is promoted by the addition of a small amount of salts and esters of monobasic organic acids.

The subject ester lubricants include both monomers and polymers. Preferably, especially when the esters are to be used as the principal ingredients of lubricating compositions they have a high viscosity index and a low pour point. Alternatively, the consistency, pour point, etc., may be suitably modified by the addition of thickeners, or other agents affecting the properties of the esters. The esters which meet these conditions most satisfactorily are those in which $R_1$ is a hydrocarbon radical having from 4 to 12 carbon atoms, while those in which $R_1$ is a hydrocarbon of 4 to 8 carbon atoms give the best over-all results. Of this group, those in which $R_1$ is a saturated aliphatic radical are the most stable, although unsaturated radicals of either olefinic or aromatic character form esters which also are suitable for use as lubricant base.

The monomers of preferred structure are those in which $R_1$ is a saturated aliphatic radical having less than 2 side chains. These are the esters of dicarboxylic acids, theoretically formed by the replacement of 2 hydrogens of a saturated hydrocarbon with two ester groups. Those in which the ester groups are terminals on opposite ends of the molecule form excellent lubricants, especially when $R_1$ has from 4 to 8 carbon atoms. These include the esters of acids having the general formula

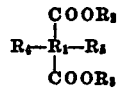

where $R_1$ is a saturated aliphatic radical having two substituents $R_4$ and $R_5$ which are hydrogens or aliphatic hydrocarbon radicals having from 1 to 5 carbon atoms and $R_2$ and $R_3$ are hydrocarbon radicals.

When $R_1$ contains 3 carbons in a straight chain, the esters are derived from such acids as methylglutaric acid, ethylglutaric acid, propylglutaric acid, isopropylglutaric acid, butylglutaric acid, its isomers, amylglutaric acid and its isomers, dimethylglutaric acid, methylethylglutaric acid, methylpropylglutaric acid, methylbutylglutaric acid and its isomers, diethylglutaric acid, and ethylpropylglutaric acid.

When $R_1$ contains 4 carbons in a straight chain, the esters are based upon the adipic acid series, such as adipic acid, 2-methyladipic acid, 2-ethyladipic acid, 2-propyladipic acids, 2-butyladipic acids, 2,2-dimethyladipic acid, 2,3-dimethyladipic acid, 2-methyl-2-ethyladipic acid, 2-methyl-3-ethyladipic acid, 2-methyl-2-isopropyladipic acid, etc.

The esters of pimelic acid derivatives, in which $R_5$ contains a straight chain of 5 carbon atoms, also fall within this preferred group. These esters are formed from such acids as pimelic acid, 2- or 3-methylpimelic acid, 2- or 3-ethylpimelic acid, 2- or 3-propylpimelic acid, 2- or 3-isopropylpimelic acid, 2,2- or 2,3-dimethylpimelic acid, or 2-methyl-2-ethylpimelic acid, 2-methyl-3-ethylpimelic acid, 3-methyl-3-ethylpimelic acid, 2-ethyl-3-methylpimelic acid, 2,2,3-trimethylpimelic acid; 2,3,4-trimethylpimelic acid, etc.

If the group $R_1$ has a straight chain of 6 carbon atoms, the esters then are derived from suberic acid, including suberic acid itself, methyl- or ethylsuberic acids, in which the methyl or ethyl groups may be in positions 2,3,4 or 5; and methylethylsuberic acids, wherein the methyl and ethyl groups are in positions 2,3,4 or 5. When $R_1$ either has 7 or 8 carbon atoms in a straight chain, the esters are based upon azelaic acid, methylazelaic acids, or sebacic acid.

While esters based upon the above acids are preferred, higher acids are useful for special purposes. In such cases $R_1$ may be a straight or branched chain, but preferably is a saturated aliphatic hydrocarbon radical.

Other useful esters are derived from acids in which $R_1$ is represented by the general formula

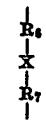

to give esters of the general formula

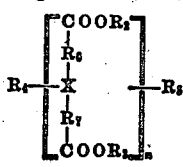

in which $n$ is an integer, $R_2$, $R_3$, $R_4$ and $R_7$ are organic radicals (preferably hydrocarbon radicals), $R_4$ and $R_5$ are either hydrogen or organic radicals and $X$ is oxygen, sulfur, selenium, tellurium or nitrogen. When esters of dibasic acids of this type form the base of the corrosion protective composition, it is preferred that $X$ is oxygen, sulfur or nitrogen, $n$ is 1, $R_4$ and $R_5$ are hydrogens and $R_6$ and $R_7$ are similar or dissimilar (the former is preferred) saturated hydrocarbon radicals, each having from 2 to 20 carbon atoms.

Hence, acids of the above type include the preferred general types of esters:

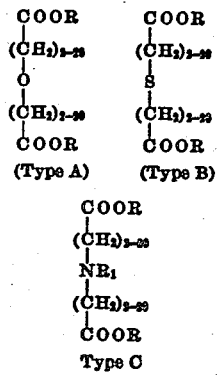

Esters of type A are derived from such acids as alpha, alpha'-dilauric, dimyristic, dipalmitic, distearic, diarachic and dioleic acid ethers. They are produced, for example, by reacting the di-alkali salt of an alpha-hydroxy carboxylic acid with an alpha- or beta-monochloro or monobromo fatty acid. The two substituents attached to the oxygen atom may be similar or dissimilar, preferably the former. The acid ether thus formed is then esterified to give the base for the compositions of the present invention. Formula type B above includes esters of acid thioethers such as alpha, alpha'- myristic, palmitic, stearic, arachic behenic acid sulfides. Type C esters are preferably tertiary amine derivatives, especially when they are anilino, toluidino or xylidino di-alpha fatty acid esters.

Two other types of esters comprise suitable bases for the subject corrosion-protective compositions. These have the general formulas:

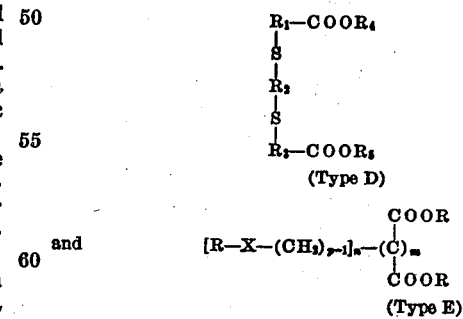

In type D esters, $R_1$, $R_3$, $R_4$ and $R_5$ are preferably saturated aliphatic hydrocarbon radicals and $R_2$ is preferably the group $—C_6H_4—$. Those esters found to comprise the most efficient corrosion-preventive bases have from 5 to 20 carbon atoms in groups $R_1$ and $R_3$. Typical esters having type D structure are derived from such acids as paraphenylene-dithio-alpha, alpha'-distearic acid.

Esters having the configuration type E include those in which $X$ is sulfur, selenium and tellurium, the $R$'s are hydrocarbon radicals, $m$ is an integer from 1 to 8, $p$ is an integer from 1 to 9,